3,309,417
CATALYTIC DEHYDROGENATION OF ALIPHATIC MONO-OLEFINS TO CONJUGATED DIOLEFINS
Arnold N. Wennerberg, Chicago, Ill., assignor to Standard Oil Company, Chicago, Ill., a corporation of Indiana
No Drawing. Filed Aug. 16, 1963, Ser. No. 302,745
11 Claims. (Cl. 260—680)

This invention relates to a method dehydrogenating hydrocarbons and more specifically pertains to a method of dehydrogenating aliphatic mono-olefin hydrocarbons to conjugated diene hydrocarbons.

The conjugated diene hydrocarbons are known to be quite reactive. One of the most important uses for conjugated diene hydrocarbons is their use as monomers or co-monomers in polymerization processes for the production of various polymeric materials. For example, either 1,3-butadiene or isoprene can be polymerized under stereoregular polymerization conditions to obtain rubbery hydrocarbon products which are substantially equivalent to or are superior to natural (Hevea) rubber. 1,3-butadiene has been copolymerized with one or more polymerizable co-monomers for the preparation of rubbery hydrocarbons. Examples of such copolymers are the rubbery copolymers of 1,3-butadiene and styrene, 1,3-butadiene and acrylonitrile, 1,3-butadiene copolymerized with ethyl acrylate and acrylonitrile and isobutylene with small amounts of 1,3-butadiene.

Many methods of preparing 1,3-butadiene and isoprene have been proposed. Some of these include catalytic dehydrogenation of alkane hydrocarbons and the catalytic dehydrogenation of alkene hydrocarbons. However, not all of these catalytic processes are available as commercially feasible processes for the reason that some of the catalyst systems also promote skeletal rearrangement of the feed hydrocarbon, the desired diene hydrocarbon or intermediate hydrocarbons thus causing a mixture of products to be formed with components which are undesirable in processes using the diene hydrocarbon and which have properties so close to the desired diene hydrocarbon with which they are produced as to make their removal from the mixture so difficult or complex that the dehydrogenation has no commerical attractiveness.

A method has been discovered for catalytically dehydrogenating mono-olefin hydrocarbons to conjugated diene hydrocarbons without substantial skeletal rearrangement of either the feed mono-olefin or the conjugated diene hydrocarbon. The method of this invention achieves high selectivity of the mono-olefin hydrocarbon to conjugated diene hydrocarbon at high conversions, i.e., conversions approaching the thermodynamic, theoretical conversions. This dehydrogenation method employs as a catalyst, a combination of oxides of three different classes of metals: a low melting metal having an atomic weight of from about 65 to about 113, more specifically zinc and cadmium; an alkaline earth metal, more specifically calcium, barium and magnesium; and aluminum. Desirably the catalyst has from 0.1 to 10 weight parts of the oxide of said low melting metals and from 0.1 to 10 weight parts of the oxide of said alkaline earth metals based on 10 weight parts of alumina. In said combination of oxides of three different metals the aluminum oxide, alumina, is in the form of the art recognized activated alumina.

In carrying out the method of this invention the feed mono-olefin hydrocarbon is contacted with the catalyst at a temperature above 400° C., but not exceeding the temperature at which the olefins undergo thermal decomposition, desirably in the range of 450 to 650° C., and preferably in the range of 500 to 600° C. Contacting the feed mono-olefin hydrocarbon with the catalyst can be accomplished with a fixed bed of catalyst and an upward or downward flow through the catalyst bed. Also, contact between the feed mono-olefin hydrocarbon and the catalyst can be accomplished with the catalyst in a moving bed or a fluidized bed. For any of these catalyst beds a high input rate of feed mono-olefin hydrocarbon can be employed. The feed mono-olefin hydrocarbon input can be most conveniently measured and controlled on a liquid volume basis. For fixed bed operation there is, of course a substantially constant volume of catalyst in each fixed bed catalyst chamber. In the use of a moving or a fluidized bed of catalyst there is with respect to an increment of time an ascertainable volume of catalyst available for contact per unit of time. Thus the feed mono-olefin hydrocarbon input is readily and conveniently expressed in terms of liquid hourly space velocity (LHSV), i.e., liquid volumes of feed mono-olefin hydrocarbon per hour per volume of catalyst. For the purposes of the method of this invention the LHSV of feed mono-olefin hydrocarbon can be in the range of from 1 to 10 liquid volumes per volume of catalyst per hour. For moving or fluidized catalyst bed the LHSV is based, of course, on the available catalyst volume in one hour of operation.

The method of this invention is a flow type process, i.e., the feed mono-olefin hydrocarbon is introduced into the catalytic conversion zone and the mixture resulting from the catalytic dehydrogenation is removed from catalytic conversion zone. Such a flow operation can be conveniently carried out by introducing the feed under a positive pressure into the catalytic conversion zone and permitting the mixture resulting from the catalytic dehydrogenation, reaction mixture, to flow out of the catalytic conversion zone for separation and recovery of the desired conjugated diene hydrocarbon from the reaction mixture and for recycle of unconverted feed mono-olefin to the catalytic conversion zone. Also, the flow process can be carried out by reducing the pressure downstream of the feed introduction to the catalytic conversion zone. In either of these modes of operation there should be provided, as a minimum, sufficient flow to overcome the pressure drop caused by the fixed, moving or fluidized catalyst beds and to provide the LHSV of feed mono-olefin hydrocarbon.

The dehydrogenation reactions involved in the method of this invention are endothermic. The catalyst employed is adversely sensitive to water and thus steam cannot be used to supply the required heat of reaction. Thus, all or a portion of the heat of reaction is supplied by a non-reactive (not reactive with the catalyst, the mono-olefin feed hydrocarbon or the desired conjugated diene) heat carrier diluent or by external heating of the catalyst before it enters and/or while in the catalytic conversion zone or a combination of heat supplied by such non-reactive diluent and heating the catalyst.

For flow systems employing the technique of pressure reduction downstream of the catalytic conversion zone, the feed mono-olefin hydrocarbon need not be diluted with a non-reactive diluent material provided that sufficient and substantially uniform heat input to the catalytic conversion zone can be achieved. However, a heat carrier diluent can be added to the feed mono-olefin hydrocarbon to supply substantially all or a portion of the heat required for the endothermic reaction. For flow sytems employing positive pressure feed stream, the heat of reaction can also be supplied in part or in toto by the use of a heat carrier non-reactive diluent, externally applied heat to the catalytic conversion zone or by the introduction to the catalytic conversion zone of hot catalyst. The latter source for supplying heat of reaction is not suitable for fixed bed operation but is suitable for moving or fluidized bed operation.

The metal oxide catalyst used in the method of this invention loses its activity on stream because of the accumulation of carbonaceous by-product deposits, mainly coke, during the catalytic conversion reaction. The formation of these deposits are believed to be formed by over-reaction, e.g., cracking, at the active sites on or in the catalyst surface. Such deactivation of dehydrogenation catalyst is common and is not peculiar to the catalyst employed in the process of this invention. However, efficient on stream life of the catalyst used in the process of this invention appears to be somewhat longer, especially when employed at the preferred temperatures than other dehydrogenation catalyst systems because high selectivity and high conversions are obtained by the process of this invention at lower reaction temperatures. The catalyst employed in the method of this invention is readily regenerated by burning off the deactivating deposits. Isolated hot spots in the catalyst are to be avoided both during catalytic conversion and during regeneration. The aforementioned means for introducing heat of reaction can be used to avoid hot spots during dehydrogenation and prevent decomposition of the catalyst and acceleration of deposit formation. Hot spot formation or formation of moving over heated front in the catalyst can be avoided during regeneration by the use of dilute sources of oxygen for controlled burning of the deposits. Use of a gaseous mixture containing up to about 10% $O_2$ by volume as a maximum is suitable especially to complete the burning of the carbonaceous by-product deposits from a fixed catalyst bed starting with a lower oxygen content, suitably 2 to 5% oxygen by volume. For regeneration of fluidized catalyst a desirable amount of oxygen is in the range of 2 to 7% and a preferred amount is in the range of 3 to 5%, both ranges are by volume. The oxygen for regeneration can be supplied by air or oxygen diluted with a non-reactive or an inert gas. Air or oxygen diluted with carbon dioxide is preferred.

The method of this invention can be conducted substantially continuously by the use of at least two fixed bed catalytic conversion zones with suitable switch valving and piping. The second fixed bed catalytic conversion zone is off stream as the first is used on stream. When the first conversion zone is approaching the minimum commercially feasible conversion, the second conversion zone is brought to reaction temperature so that it can be put on stream and the first catalytic conversion zone taken off stream for regeneration. Regeneration of the catalyst returns it substantially to its high selectivity ability.

The catalysts used in the method of this invention will, depending on the method of preparing the catalyst composition, have activity differences in degree both with respect to fresh catalyst and regenerated catalyst. These activities differing in degree are readily understood from a consideration of the two different types of catalysts obtainable from various modes of preparation. One type of catalyst has the oxides of both alkaline earth metal and low melting metal on or in the surface of the alumina as for example resulting from the deposition on or impregnation of particles of alumina with low melting metal or compounds thereof and compounds of alkaline earth metals which compounds are convertible to the oxides as for example by calcination. The second type of catalyst is substantially homogeneous resulting from the mixing of compounds of all three metals as in a solution or in a dispersion or mixing a suspension with a solution or by some other manner, simultaneously precipitating a homogeneous mixture of the metals as the same or different compounds and then converting the recovered homogeneous precipitate or mixture to a substantially homogeneous mixture of oxides, e.g., by calcination.

When catalyst compositions having the same weight ratios of the three different metal oxides are considered it is readily understood that the first type of catalyst has substantially all of the oxides of alkaline earth metal and low melting metal on or in the surface of the alumina particles. Loss of any one of the oxides on or in the alumina surface during regeneration would result in a change in activity when put back on stream. Loss of one of the oxides on or in the alumina surface when first placed on stream resulting from the deposition or impregnation of more of that metal oxide than could be retained would also make the catalyst appear after regeneration to have change in activity. Then considering the catalyst of the second type, substantially homogeneous mixture of the three different metal oxides, against the first type, it will be appreciated that the composition of the surface of the second type will be substantially different even though the catalyst of the first type and the catalyst of the second type both have identical weight quantities and weight ratios of the same metal oxides.

For the purpose of defining the method of this invention in the descriptive disclosure and exemplification as well as in the claims, whenever the terms "alumina" or "$Al_2O_3$" are used in defining the catalyst used, that term means activated or catalytic oxide of aluminum because the oxide of aluminum is an essential portion of the composition for catalysis. Hence, the terms "alumina" or "$Al_2O_3$" do not include the known catalytically inactive alpha alumina. Also for the purpose of simplification and clarity the first type of catalyst (oxides of both alkaline earth metal and low melting metal deposited on or impregnated in the surface of alumina) is referred to as "heterogeneous type catalyst" and the second type of catalyst as "substantially homogeneous type catalyst."

Some of the substantially homogeneous type catalysts low in oxide of low melting metal, e.g., below 3 parts of CdO or ZnO per 10 parts alumina, appear to drop in conversion ability on regeneration. For this reason for use in the method of this invention substantially homogeneous type catalyst compositions contain desirably on the basis of 10 weight parts of $Al_2O_3$ at least 3 weight parts of ZnO or CdO and preferably 3–6 parts of ZnO and CdO. Also, it has been found that substantially homogeneous type catalysts containing 3.0 or more parts of ZnO per 10 parts of $Al_2O_3$ by weight appear to provide the highest catalysis with respect to both selectivity and conversion as both fresh catalyst and regenerated catalyst.

With respect to the use of catalyst compositions in the method of this invention those containing oxides of calcium and/or barium appear to possess about the same high conversion properties as those containing magnesium oxide but the selectivity of CaO and BaO containing catalysts are lower. Accordingly, the use of substantially homogeneous type catalyst compositions containing the component weight part ratios in the range of 3 to 10 ZnO and CdO, 1 to 10 MgO and 10 $Al_2O_3$ are most suitable with those having the component weight part ratios in the range of 3 to 6 ZnO, 3 to 6 MgO, and 10 $Al_2O_3$ being preferred for both initial high selectivity and conversion after repeated cycles of use and regeneration.

As diluent and/or heat carriers there can be used inert gases such as nitrogen, non-reactive gases such as the once called "inert gases" helium, neon, argon, etc. Although these once called "inert gases" have recently been found to enter into certain reactions, they are non-reactive in the process of this invention. Also useful as diluents and/or heat carriers are liquid saturated alkanes from 2 to 10 carbon atoms since the catalyst used in the method of this invention does not possess the requisite catalysis properties to dehydrogenate alkanes. Aromatic hydrocarbons which are not readily converted to compounds having unsaturated substituent carbon chains are useful as diluents and/or heat carriers. These include benzene, toluene and the xylenes among others. Benzene is especially useful because of its rather high heat capacity, its high thermal stability and its ability to release certain mono-olefin hydrocarbons absorbed by sulfuric acid. For example, the method of this invention can convert a $C_5$ stream containing isoamylenes to isoprene. Production of isoprene can be maximized by the use of high concentration isoamylene feed. Suitably high concentrations of isoamylene can be obtained by contacting a $C_5$ stream containing isoamylene with concentrated sulfuric acid which absorbs isoamylene. A heavy hydrocarbon can be used to release isoamylene from sulfuric acid but then isoamylene might have to be recovered by fractionation. Using benzene as the heavy hydrocarbon to release isoamylene from sulfuric acid provides a mixture whose diluent has both high heat capacity and high thermal stability, does not react readily with isoprene and is readily separated from isoprene. Thus benzene is preferred as the hydrocarbon diluent and/or heat carrier.

In carrying out the method of this invention a flow process employing a positive feed pressure to the catalytic conversion zone is preferred. The total pressure of the feed stock, mono-olefin hydrocarbon plus diluent, can vary substantially depending upon the characteristics of the diluent and the mole fraction of the total feed which it represents. For this reason it is difficult to assign a meaningful feed pressure range with respect to the feedstock. However, satisfactory results can be achieved with feedstocks which have at 25° C. partial pressures in the range of 0.01 to 2 pounds per square inch. Or on another basis dilution of the feed mono-olefin hydrocarbon with from 1 to 100 moles, preferably 5 to 15 moles, of diluent per mole of said mono-olefin will provide suitable feedstocks for the positive pressure flow system technique of carrying out the method of this invention using fixed bed, moving bed or fluidized catalyst.

A convenient means for conducting the method of this invention is to employ two concentric annuli fixed beds of equivalent catalyst volume. The inner annulus can be externally heated from the inner core. The outer annulus can be heated by an external jacket. However, by suitable valve switching and conduits the outer annulus can be undergoing regeneration while the inner annulus is on stream as the catalytic conversion zone and heat for the endothermic reaction can be obtained for the catalytic conversion from heat generated by the regeneration of the catalyst in the outer annulus. In a similar manner, when the outer annulus catalyst bed is on stream as the catalytic conversion zone, regeneration of the catalyst in the inner annulus will supply heat for the endothermic reaction in the outer annulus.

The use of fixed bed catalyst, moving catalyst bed and fluidized catalyst is sufficiently familiar to those skilled in this art so that a detailed description of their uses is not warranted.

The method of this invention will be better understood from illustrative examples thereof, hereinafter appearing.

An impregnated type of $ZnO$-$MgO$-$Al_2O_3$ catalyst is prepared by first suspending 20 grams $Mg(OH)_2$ and 100 grams alumina (20–48 mesh) in one liter of distilled water, evaporating water at 20 mm. Hg and 80° C., calcining the resulting mixture starting at 100° C. and ending at 600° C. at 0.01 mm. Hg. The calcined solid is transferred under argon gas blanket to a vessel containing 16 grams molten zinc at 480° C. also under argon gas blanket and the mixture is stirred. Then 20 grams of the mixture is transferred under argon gas blanket to a tubula conversion zone, exposed to 3% $O_2$–97% $CO_2$ at elevated temperature starting at 300° C. and increasing to 525° C. This freshly prepared catalyst is then ready for use.

In the following illustrative examples fresh catalyst as hereinabove described is charged to a dehydrogenation conversion reactor, for example, a tube containing a preheat zone and a catalytic conversion zone. The catalyst is charged as a fixed bed in the catalytic conversion zone and the preheat zone is packed with granular solid particles of refractory catalytic inactive material such as tabular alumina (alpha-alumina) which provides high heat transfer surface. Such a tubular dehydrogenation conversion reactor can be inserted into a furnace or surrounded with a heat exchange liquid which will provide the necessary heat to preheat the feedstock to and maintain the catalytic conversion zone at the dehydrogenation temperature. In the illustrative examples such a tubular dehydrogenation conversion reactor heated with a furnace is employed.

In the methods of the illustrative examples the exit pressure from the catalytic conversion zone is about 19 to 20 pounds per square inch absolute (p.s.i.a.). The inlet pressure then is, of course, above the exit pressure in an amount to overcome the pressure drop in the catalytic conversion zone. The olefin hydrocarbon feed partial pressures indicated in the illustrative examples is that partial pressure calculated from the operating pressure and the mole fraction of olefin feed in the feedstock mixture. The olefin feed is introduced in the preheat zone in an amount admixed with the diluent to provide the olefin to catalyst LHSV ratios indicated.

Examples 1 and 2

Mixtures of either argon and isoamylene (mole ratio of 6 to 1) or nitrogen and isoamylene (mole ratio of 7.1 to 1) are used as feedstock. The catalyst in the conversion tube is maintained at 590° C. The foregoing feedstocks are introduced at a rate to provide isoamylene liquid hourly space velocity (LHSV) of 5 volume isoamylene per hour per volume of catalyst. The feedstock is introduced into the conversion tube at a pressure providing a positive partial pressure of isoamylene of 2 to 3 pounds per square inch absolute. By these processes the following results are obtained:

|  | Nitrogen Diluent | Argon Diluent |
|---|---|---|
| Initial conversion of isoamylene, percent | 40–45 | 38–42 |
| Selectivity conversion to isoprene, percent | 90 | 83 |
| Conversion isoamylene to piperylene, percent | 0.4 | 4.7 |

Initial conversion in the foregoing processes and subsequent processes is measured five minutes after the catalyst is first contacted with feedstock.

Examples 3 and 4

Mixtures of argon and isoamylene and nitrogen and isomylene in the mole ratios used in Examples 1 and 2 are used as feedstock with the same amount of fresh catalyst prepared as hereinbefore described and used in Examples 1 and 2 at 2.5 LHSV but these processes are conducted at 525° C. with the following results:

|  | Nitrogen Diluent | Argon Diluent |
|---|---|---|
| Initial conversion of isoamylene, percent | 22.8 | 22.4 |
| Selectivity conversion to isoprene, percent | 95 | 93 |
| Conversion isoamylene to piperylene, percent | 0.01 | 0.02 |

Decreasing the conversion temperature decreases conversion of isoamylene to isoprene as well as to piperylene but increases the selectivity of conversion isoamylene to isoprene. Increasing the feed rate, increase of LHSV of isoamylene to catalyst, has the same effect of increasing selectivity by decreasing conversion of isoamylene and production of piperylene.

Isoamylene (2-methylbutene-1) diluted with nitrogen (5 moles nitrogen per mole isoamylene) is introduced into conversion zones where a substantially homogeneous type catalyst is maintained at about 590° C. Isoamylene partial pressure in feedstock mixture is about 125 mm. Hg absolute and feed rate, LHSV, is 10. The variables in these processes are the catalyst composition as well as catalyst type. Example 5 describes the performance of a heterogeneous type catalyst (prepared by impregnation) for comparison with substantially homogeneous type catalyst compositions used in Examples 6, 7, 8, 11, and 12. For purposes of comparison there is also given catalysts with no zinc oxide (MgO and Al$_2$O$_3$) and only alumina, Examples 9 and 10, respectively. Where "Cycle No." is shown, each catalyst was on stream about 90 minutes for each cycle with regeneration between cycles using 2 to 5% O$_2$–98 to 95% CO$_2$ at about 500° C. The results of these processes are shown in Table I.

Example 16

A mixture of 2-methylbutene-1 and 3-methylbutene-1 in the ratio of 2 weight parts of the former per weight part of the latter (which may be obtained for examples by the recovery of such a mixture of methylbutenes from the reaction of propylene with ethylene at about 70–80° C. in the presence of triethyl aluminum and titanium tetra-

TABLE I.—CONVERSION ISOAMYLENE TO ISOPRENE AT 590° C. AND LHSV OF 10

| Example Number | Catalyst Composition | | | Cycle Number | Initial Conversion, Percent | Selectivity, percent | |
|---|---|---|---|---|---|---|---|
| | ZnO | MgO | Al$_2$O$_3$ | | | Feed Basis | Product Basis |
| 5 | 0.68 | 0.68 | 10 | 1 | 32.3 | 96.3 | 87.7 |
| | | | | 2 | 32.0 | 96.5 | 86.2 |
| | | | | 3 | 31.7 | 97.6 | 87.6 |
| 6 | 1.25 | 1.25 | 10 | 1 | 22.0 | 90.4 | 69.6 |
| | | | | 2 | 24.3 | 88.8 | 68.5 |
| | | | | 3 | 21.1 | 91.8 | 72.0 |
| 7 | 3.33 | 3.33 | 10 | 1 | 33.7 | 94.6 | 86.2 |
| | | | | 2 | 32.8 | 95.6 | 88.2 |
| 8 | 0.56 | 0.56 | 10 | 1 | 16.0 | 85.0 | 51.6 |
| 9 | 0 | 2.5 | 10 | 1 | 6.4 | 86.1 | 31.5 |
| 10 | 0 | 0 | 10 | 1 | 6.3 | 71.9 | 18.3 |
| 11 | 5 | 1.6 | 10 | 1 | 28.6 | 96.2 | 88.3 |
| | | | | 2 | 33.6 | 95.0 | 87.1 |
| 12 | 1.6 | 5.0 | 10 | 1 | 33.7 | 95.9 | 89.1 |
| | | | | 2 | 28.9 | 96.7 | 89.8 |
| | | | | 3 | 22.9 | 97.5 | 90.1 |

As can be seen from a comparison of the results of Example 2 with the results of Example 7, a heterogeneous type catalyst with component weight part ratio of 0.68 ZnO-0.68 MgO-10 Al$_2$O$_3$ is roughly equivalent in performance to a substantially homogeneous type catalyst with component weight part ratio of 3.33 ZnO-3.33 MgO-10 Al$_2$O$_3$. With both type catalysts the optimum component weight part ratio is approximately 1/1 for the ZnO/MgO components. Those skilled in the art of catalysts will appreciate why a homogeneous type catalyst of lower ZnO and/or MgO content is equivalent in activity to a substantially homogeneous type catalyst of higher ZnO and/or MgO content.

In general, in the method of this invention, the conversion drops in about one hour at LHSV of 10 to about one-half initial conversion although selectivity remains about constant. Thus, after recovery of isoprene from the product, unconverted isoamylene can be recycled to extinction without loss of selectivity.

Examples 13 and 14

Isoamylene diluted as shown with argon as the feedstock charged at the LHSV of 2.5 (partial pressure isoamylene in feedstock—2 to 3 p.s.i.a.) with catalyst as shown at 525° C. produces the following results:

butylate) is admixed with benzene to provide a dilution having at 525° C. a partial pressure of the substituted butenes of about 2.5 p.s.i.a. The mixture is preheated to 525° C., and contacted with catalyst containing 3.3 ZnO-3.3 MgO-10 Al$_2$O$_3$ at about 525° C. and a butene LHSV of 2.5. The effluent from the catalytic conversion zone is condensed and the condensate recovered. The condensate is fractionated to first remove the unconverted methyl substituted butene-1 compounds and then to recover isoprene. By this process an initial conversion in the range of 20 to 23% is obtained of the methylbutenes at 90 to 95% selectivity on product.

Example 17

An isoamylenes mixture is catalytically dehydrogenated to isoprene by diluting the isoamylenes with butane both as diluent and heat carrier fo rthe endothermic reaction. Nitrogen is also used as a feedstock carrier gas. The mole ratio of butane and nitrogen per mole isoamylenes is 3.5 N$_2$-3.5 butane to 1. The catalyst comprises 3.3 ZnO-3.3 MgO:10 Al$_2$O$_3$. The dehydrogenation temperature is 560° C. The isoamylene LHSV ratio is 5. By this process the initial conversion of isoamylene to isoprene is 28% and the selectivity is 90% (on product).

| Argon dilution, moles A/mole isoamylene | Catalyst Composition, Weight Ratio | Initial Conversion, percent Feed | Selectivity, percent (on product) |
|---|---|---|---|
| 6 to 1 | 1.25 ZnO-1.25 BaO-10 Al$_2$O$_3$ | 22.4 | 90. |
| 7.5 to 1 | 1 CdO-1 MgO-10 Al$_2$O$_3$ | 14.1 | Above 85. |

Example 15

Butene-1 and 2 diluted with nitrogen on the mole basis of 9 N$_2$ to 1 C$_4$ provides the feedstock. The butene partial pressure is 3 p.s.i.a. and the C$_4$ LHSV is 5. The catalyst is a substantially homogeneous type catalyst having the component weight ratio of 3.33 ZnO, 3.33 MgO and 10 Al$_2$O$_3$. The catalyst in the conversion zone is maintained at 600° C. The initial conversion of butenes to 1,3-butadiene is 28–30% with a 90 selectivity (on product).

Examples 18 and 19

An isoamylenes mixture is catalytically dehydrogenated to isoprene by employing benzene as the heat carrier and diluent and nitrogen as a feedstock carrier gas. Two different benzene dilutions are employed. The mole ratios of benzene and nitrogen to isoamylenes is A: 2 benzene-5 N$_2$-1 isoamylenes and B: 5 benzene-2N$_2$-1 isoamylenes. The catalyst comprises 3.3 ZnO-3.3 MgO-10 Al$_2$O$_3$. The dehydrogenation temperature is 590° C. and isoamylenes to catalyst LHSV ratio is 5:1. These two feed dilutions are used to illustrate the effect of benzene dilution. The initial conversion of isoamylenes to isoprene of the A dilution feedstock results in an initial conversion typically in the range of 30 to 33%. The initial conversion of the B dilution is typically 23–26. These results show that an increase in benzene diluent content tends to depress initial conversion possibly because of the added competition for active catalyst sites contributed by the increased benzene concentration. However, the onstream life of the catalyst is increased substantially by the higher benzene concentration possibly because of the added benzene competition for catalyst sites reduction of polymer formation and carbonization thereof on the active catalyst sites.

*Example 20*

Isoprene can be obtained by contacting a feedstock comprising 4 moles n-pentane and 3 moles nitrogen per mole mixed amylenes at 590° C., and LHSV of 10 with any of the ZnO-MgO-Al$_2$O$_3$ catalysts of the foregoing examples. High initial conversions of isoamylene to isoprene at selectivities are obtainable.

Using the same catalyst at the same temperature there has been observed with high isoamylene to catalyst ratios, LHSV values of 10 and above, that variations in isoamylene partial pressure (variations in dilution of isoamylene) do not substantially change initial conversions. However, increased dilution (decreased partial pressures) of isoamylene and decreased LHSV values, 7 to 5 and lower, materially increase the initial conversions of isoamylenes to isoprene. These observations are from the use of fixed catalyst bed operations. In general for any catalyst bed LHSV rates of from 1 to 20 are suitable and from 1 to 10 are desirable with rates of from 3 to 7 preferred for fixed catalyst bed operation.

The dehydrogenation of an olefin proceeds according to the following reversible equation where, only for illustrative purposes, the dehydrogenation of the terminal C$_4$ mono-olefin hydrocarbon is shown, and for the purposes of this illustration the size (number of carbons) is not significant:

$$CH_3Ch_2\text{---}CH=CH_2 \rightleftharpoons CH_2=CH\text{---}CH\text{---}CH_2+H_2$$

An increase in operation pressure (exit pressure above atmospheric) is less favorable to the equilbrium distribution of the diene hydrocarbon in the dehydrogenation products because increased pressure directs the equilbrium to the left. Operation exit pressures of up to 2 atmospheres absolute pressure are suitable. However, exit pressures of up to 1.5 atmospheres absolute are more desirable and exit pressures of from 1.25 down to at least 1.0 atmosphere absolute are preferred. As hereinbefore stated, exit pressures of below 1.0 atmosphere can be used, in fact reduced pressure of down to 125 mm. Hg or below can be used in processes where heat can be added externally (no heat carrier diluent used) to satisfy the requirement of the endothermic reaction. A reduced pressure of about 125 mm. Hg is equivalent to an olefin feed partial pressure of about 2.5 p.s.i.a. with no diluent. The foregoing 125 mm. Hg reduced pressure is not a minimum reduced pressure but is employed here as illustrative. The minimum reduced pressure is controlled by design and economic considerations and not thermodynamic considerations for pressures below 1.0 atmosphere absolute favor the foregoing equilibrium reaction going to the right. The partial pressures desirable at catalytic conversion zone effluent exit pressures of one to two atmospheres absolute are in the range of 1 to 10 pounds per square inch absolute and preferably 3 to 5 p.s.i.a.

With respect to the thermodynamic equilibrium for the conversion of isoamylenes to isoprene, the theoretical equilibrium concentration of isoprene in the dehydrogenation product at 525° C. (single pass) and a partial pressure of isoamylenes of 2.5 to 2.7 p.s.i.a. is in the range of 22 to 23%. Thus, initial conversions at 525° C. on product basis of 21 to 22% (single pass) approach theoretical conversions at 525° C.

In contrast to the results in the illustrations of the method of this invention, a commercial process using a different catalyst system at temperature of 650° C., LHSV in the range of 1 to 2, steam dilution of butene at the mole ratio of 14 to 1 and butene partial pressure of 2 p.s.i.a results in an initial conversion of 38% but only at 67% selectivity. Thus the process of this invention with respect to converting butenes to 1,3-butadiene is superior both with respect to conversion and selectivity over the commercial process.

The superiority of the method of this invention is readily apparent from comparisons with the results obtainable with two commercial catalytic processes conducted at their reported best mode of operation. In the first process isoamylene-isoamylane mixture provides the feedstock with a feed pressure of 3–4 p.s.i.a. The catalyst is a chromia-alumina catalyst and the conversion temperature is 625° C.–630° C. at feed LHSV of ⅛–2.0. This process results in a conversion per pass of 11.0 moles percent total feed to isoprene at a selectivity of 55 to 60%. This catalyst when used in the method of this invention at the following conditions:

Feedstock 5/1 N$_2$/isoamylene mole ratio
Temperature=525° C.
Feed partial pressure=125 mm. Hg
LHSV=2.5 gave 18.0 mole percent to isoprene conversion/pass at a selectivity of 85%.

The second process uses as a feedstock a steam-isoamylene mixture (14 moles steam per mole of isoamylene) with an isoamylene partial pressure of about 2 p.s.i.a. at an isoamylene to catalyst LHSV ratio of 1 to 2. The catalyst is a combination of the oxides of magnesium, iron, copper and potassium. The conversion temperature is 650° C. This process results in about a 50% conversion of isoamylene to isoprene at about 70% selectivity.

The method of this invention is particularly suited to dehydrogenation of C$_4$ and higher mono-olefin hydrocarbons. Dehydrogenation of C$_4$ mono-olefin hydrocarbons produces C$_4$ conjugated dienes of which 1,3-butadiene is most notable. The C$_5$ mono-olefin hydrocarbons are also converted to C$_5$ diene hydrocarbons as has been illustrated by the conversion of isoamylenes (2-methylbutene-1 and 3-methylbutene-1) to isoprene. However, with respect to other of the C$_5$ mono-olefins and higher mono-olefins having only four or five carbon chains, these can also be converted to conjugated diene hydrocarbons without skeletal rearrangement. For example, pentene-1 and pentene-2 can be converted with a 3.3 ZnO-3.3 MgO-10 Al$_2$O$_3$ catalyst at 575 to 600° C., pentene partial pressure of 126 mm. Hg absolute and LHSV of pentene to catalyst of 5 to 1 piperylene at initial conversions of 35% at 78% selectivity on product basis. Also, 2-ethylbutene-1 or 3-ethylbutene-1 can be converted to 2-ethyl-1, 3-butadiene, 2,3-dimethylbutene-1 can be converted to 2,3-dimethyl-1, 3-butadiene, 3-methylpentene-2 can be converted to 3-methyl-1,3-pentadiene, 3-ethylpentene-2 can be converted to 3-ethyl-1, 3-pentadiene and other similar mono-olefin (alkene) hydrocarbons having 4 or 5 carbon atoms in their chain but having a total of more than 5 carbon atoms can be converted to the corresponding diene hydrocarbons having the same skeletal structure by the method of this invention.

What is claimed is:

1. A method of dehydrogenating a mono-olefin hydrocarbon feed having only 4 to 5 chain carbon atoms to the corresponding diene hydrocarbon without substantial skeletal rearrangement which comprises contacting in a catalytic conversion zone said mono-olefin hydrocarbon at a temperature above 400° C. with a solid catalyst consisting essentially of oxides of three different metals which comprise alumina and one each from alkaline earth metal oxide and from oxides of metals selected from the class consisting of cadmium and zinc each in the range of from 0.1 to 10 weight parts for each 10 weight parts of alumina.

2. The method of claim 1 wherein the temperature is in the range of 450 to 650° C.

3. The method of claim 1 wherein the mono-olefin feed hydrocarbon rate to catalyst volume on the basis of feed liquid hourly space velocity is in the range of 1 to 20 liquid volumes per hour per volume of catalyst.

4. The method of claim 1 wherein the absolute pressure of the mono-olefin feed hydrocarbon is in the range of about 125 mm. Hg up to about 10 pounds per square inch.

5. The method of claim 1 wherein the mono-olefin feed hydrocarbon is a methyl substituted butene.

6. The process of claim 1 wherein the mono-olefin feed hydrocarbon is a normal unsubstituted butene.

7. The method of claim 1 wherein the mono-olefin feed is a mixture of mono-methyl-butenes and the dehydrogenation product is isoprene, the methylbutene mixture is contacted in the catalytic conversion zone at a temperature in the range of 500 to 600° C. and the solid catalyst has the component composition weight ratio of from 0.1 to 10 parts each of zinc oxide and magnesia for each 10 parts alumina.

8. The method of claim 7 wherein said solid catalyst is contacted with the mixture of mono-methyl butenes at a rate to provide for each volume of said solid catalyst from 1 to 20 liquid volumes of said methylbutenes per hour, and the catalytic conversion zone effluent is withdrawn at a pressure of from about two atmospheres to subatmospheric pressure.

9. The method of claim 8 wherein said catalytic conversion zone effluent is withdrawn at a subatmospheric pressure to 125 mm. Hg.

10. The method of claim 8 wherein said methylbutenes are introduced into said catalytic conversion zone diluted with a non-reactive gasiform diluent providing a concentration of said methylbutenes corresponding to a partial pressure of from 2 to 5 pounds absolute when the catalytic conversion zone exit pressure is in the range of 1 to 2 atmospheres.

11. The method of claim 1 wherein the feed is unsubstituted normal butene the catalytic conversion zone is maintained at a temperature in the range of 500 to 600° C., the solid catalyst consisting essentially of a combination of alumina, magnesia and zinc oxide in the component weight ratio of 0.1 to 10 parts each of magnesia and zinc oxide for each 10 parts of alumina, said normal butene is contacted with said solid catalyst at a rate to provide for each volume of said solid catalyst from 1 to 20 liquid volumes of said normal butene per hour, and the catalytic conversion zone effluent is withdrawn at a pressure of from about two atmospheres to subatmospheric pressure.

References Cited by the Examiner

UNITED STATES PATENTS

| | | | |
|---|---|---|---|
| 2,265,641 | 12/1941 | Grosskinsky et al. | 260—680 |
| 2,370,797 | 3/1945 | Kearby | 260—680 |
| 2,371,087 | 3/1945 | Webb | 260—680 |
| 2,391,646 | 12/1945 | Schulze et al. | 260—680 |
| 2,461,147 | 2/1949 | Davies et al. | 260—680 |

FOREIGN PATENTS 565,241   11/1944   Great Britain.

OTHER REFERENCES

Ohlinger: I. G., Farben Report O.P.B. No. 13,636, Report No. R.M.–302 (Sept. 27, 1945) pages 1–8 of translation relied on, TP 156.C3505.

DELBERT E. GANTZ, *Primary Examiner.*

R. H. SHUBERT, *Assistant Examiner.*